United States Patent [19]

Akin, Jr.

[11] Patent Number: 4,867,533
[45] Date of Patent: Sep. 19, 1989

[54] FRICTION LOCK FOR OPTICAL ADJUSTMENT

[75] Inventor: Alfred A. Akin, Jr., W. Covina, Calif.

[73] Assignee: Bausch & Lomb Incorporated, Rochester, N.Y.

[21] Appl. No.: 834,631

[22] Filed: Feb. 27, 1986

[51] Int. Cl.⁴ .............................................. G02B 7/02
[52] U.S. Cl. ................................ 350/2532; 350/542; 350/552
[58] Field of Search ............... 350/255, 319, 539–548, 350/553, 514, 556, 563, 552

[56] References Cited

U.S. PATENT DOCUMENTS

| | | |
|---|---|---|
| 712,113 | 10/1902 | Bausch et al. |
| 905,979 | 12/1908 | Bausch. |
| 1,067,532 | 7/1913 | Mackensen. |
| 1,127,720 | 2/1915 | Baille-Lemaire. |
| 2,267,711 | 2/1940 | Bailey. |
| 2,386,394 | 1/1942 | Grier. |
| 3,744,872 | 7/1973 | Akin, Jr. et al. |
| 4,297,002 | 10/1981 | Meatabi ........................... 350/255 |
| 4,325,602 | 4/1982 | Lange .............................. 350/542 |
| 4,428,651 | 1/1984 | Calcutt. |
| 4,478,491 | 10/1984 | Kawai .............................. 350/255 |

Primary Examiner—John K. Corbin
Assistant Examiner—Loha Ben
Attorney, Agent, or Firm—DeWitt M. Morgan; John S. Norton

[57] ABSTRACT

A lock ring prevents inadvertent rotation of a rotatable focusing eyepiece for an optical instrument. The ring is disposed on the device and is fixed against rotation. A face is provided on the ring which is adapted to frictionally engage the eyepiece to prevent inadvertent rotation thereof. The ring is movable or deformable to disengage the face from the eyepiece for focusing.

20 Claims, 1 Drawing Sheet

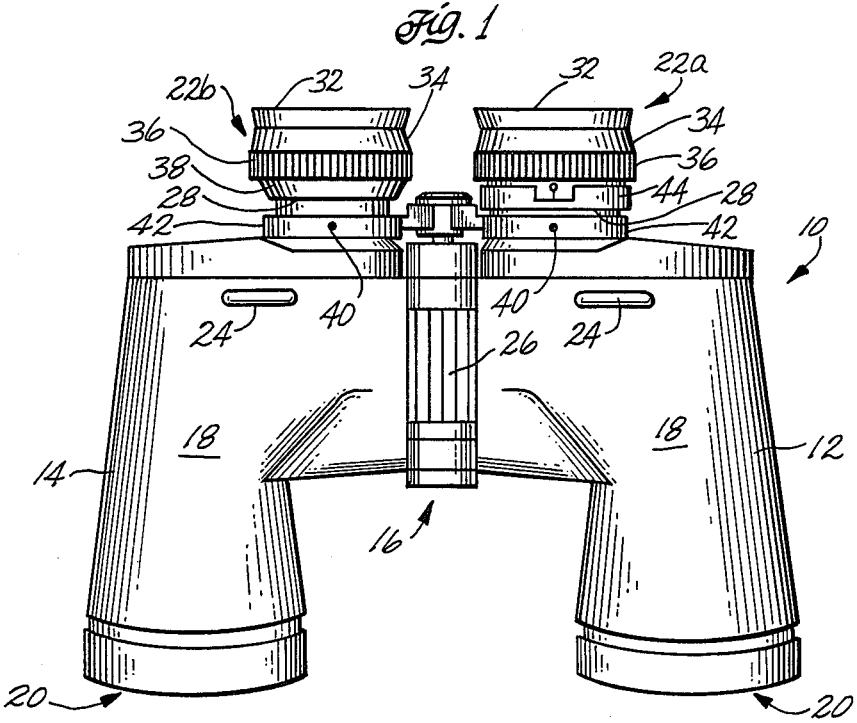
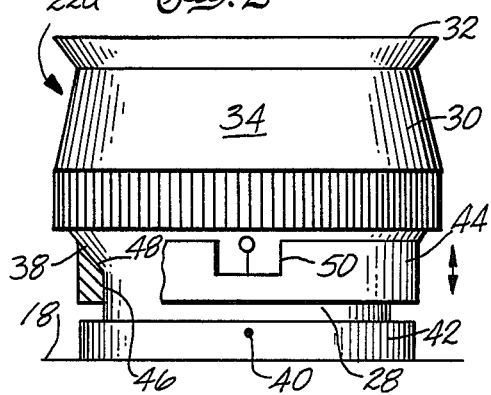
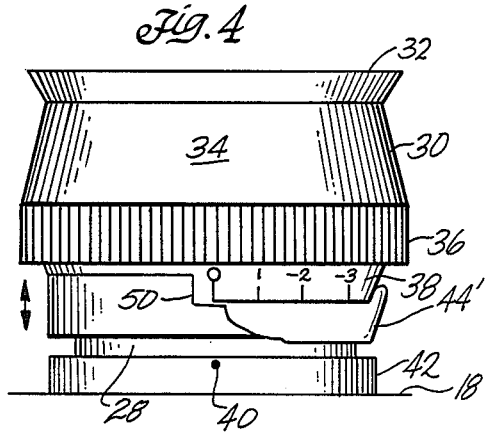
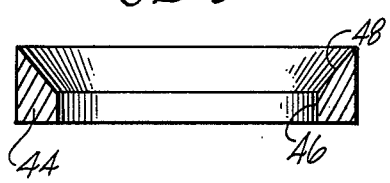
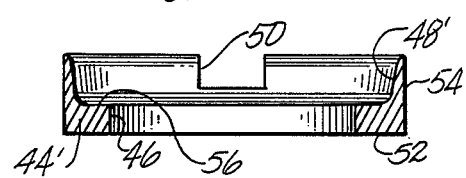

FRICTION LOCK FOR OPTICAL ADJUSTMENT

FIELD OF THE INVENTION

This invention relates to viewing devices such as telescopes, binoculars or the like. More particularly, it relates to devices for locking a focusing eyepiece against inadvertent movement.

BACKGROUND OF THE INVENTION

As is well known, binoculars provide a magnified view of an image to each eye. The optics to provide such an image include various lenses and perhaps prisms. To focus the binoculars and compensate for the user's prescription or diopter, the binoculars are provided with ocular lenses at eyepieces one or both of which are adjustable for focusing. As is commonly found in binoculars, and as an example of the prior art, one of the eyepieces is adjustable to the user's particular diopter. Usually, the adjustable eyepiece is threadably coupled to a tube fixed against rotation to the binocular casing. In addition to the adjustability of the eyepiece (hereinafter referred to as the diopter eyepiece) a common adjustment may be provided to simultaneously move both eyepieces to focus the image based upon its distance from the observer. Hence, to operate the binoculars, the user views an object and manipulates the common adjustment until the object is in focus in the eyepiece which is not the diopter eyepiece. Thereafter, the diopter eyepiece is rotated relative to the tube causing the ocular lens to focus the image of the object. As adjusted, a magnified, binocular view of the object is provided. Thereafter, i.e. after the diopter eyepiece has been adjusted to focus the image depending upon the user's prescription, the common adjustment is used to focus the binoculars based upon the relative distance of the particular object to be viewed from the observer.

Of course, it is to be understood that some binoculars may provide for independent adjustment of both eyepieces. Further, for telescopes and monoculars a single eyepiece is provided which is adjustable to focus an image based upon not only the user's prescription but also the relative distance of the image from the observer.

A problem heretofore encountered with eyepieces which are adjustable (and particularly those which are adjusted relatively infrequently, such as a diopter eyepiece for binoculars) is that the diopter eyepiece may be inadvertently rotated, thereby rendering the binoculars out of focus. For example, the observer may inadvertently twiddle the diopter eyepiece or during walking or other movement the contact of the diopter eyepiece with clothing or the like may tend to rotate the eyepiece out of focus. For activities such as bird watching or hunting, an out of focus device presents problems. With reference to binoculars, should the eyepiece be out of focus, when the observer raises the binoculars and adjusts the common adjustment based upon the range of the bird, the image will be out of focus. Since the bird or big game may be visible for only a few seconds, the time necessary to readjust the diopter eyepiece may frustrate clear observation of the bird or beast.

SUMMARY OF THE INVENTION

There is, therefore, provided in the practice of the present invention a friction lock for an optical adjustment such as a diopter eyepiece for binoculars which prevents the eyepiece from being inadvertently rotated out of focus while still providing for the occasional adjustment necessary to focus the eyepiece based at least in part upon the user's prescription.

Toward this end, the invention is directed toward a viewing device of the type having a mount and an eyepiece rotatably disposed on the mount, the eyepiece retaining a focusing, ocular lens. Means are provided between the mount and housing for translating rotation of the eyepiece into movement of the ocular lens along an optical axis for focusing of the device. The improvement according to the present invention includes a lock ring fixed about the mount against rotation, the ring being movable or deformable from a retracted position where it is displaced from the eyepiece to a lock position where the lock ring, and more particularly a frictional locking surface thereof, frictionally engages and couples the eyepiece to the mount against rotation to prevent inadvertent rotation thereof.

More particularly, the lock ring is adapted to be disposed about the eyepiece tube of a diopter eyepiece, the lock ring presenting an annular face for engagement with the eyepiece. The ring is movable axially along the eyepiece tube or a portion is deformable to retract the face to a position displaced from the eyepiece to provide for focus adjustment thereof to a lock position where the face frictionally engages a mating surface for the eyepiece to prevent inadvertent rotation.

In use, the lock ring is positioned in a retracted position and the diopter eyepiece is adjusted depending upon the user's prescription. After the adjustment, the lock ring is moved or deformed to the lock position where the ring frictionally couples the rotatable eyepiece to the tube to prevent inadvertent rotation of the eyepiece and hence maintains the eyepiece of the device such as binoculars, adjusted to the user's prescription. Thereafter, to use the binoculars, the common adjustment can be quickly used to produce a magnified image of an object such as a bird, animal, athlete or the like depending solely upon the distance of the object from the observer.

It is believed that the frictional lock according to the present invention is highly advantageous in that frequent readjustment of the optical device, using binoculars as an example, is not necessary. The common adjustment typically provided on modern binoculars quickly focuses the image and hence, by the facility of a lock ring, produces a clear image quickly and easily to the observer.

BRIEF DESCRIPTION OF THE DRAWINGS

These and other features and advantages of the present invention will become appreciated as the same becomes better understood with reference to the specification, claims and drawings wherein:

FIG. 1 is a bottom view of a typical pair of binoculars incorporating the device according to the present invention;

FIG. 2 is an enlarged view of one embodiment of the lock ring according to the present invention for use with an adjustable eyepiece;

FIG. 3 is a diametrical section view of the lock ring according to FIG. 2;

FIG. 4 illustrates another embodiment of a lock ring according to the present invention; and FIG. 5 is a diametrical section view of the lock ring of FIG. 4.

DETAILED DESCRIPTION

Turning to the drawings, FIG. 1 shows a pair of binoculars 10 which include the frictional lock ring according to the present invention. While the following description is directed toward the use of the present invention with binoculars, it is to be understood that the frictional lock ring could also be used with monoculars, spotting scopes, telescopes or the like.

The binoculars 10 include a pair of monoculars 12 and 14 joined by a hinge connection 16 which permits the monoculars 12 and 14 to be moved apart and drawn together based upon the spacing of the individual's eyes. Monoculars 12 and 14 are substantially similar, each including a hollow casing 18 which houses optical components such as lenses and prisms as are commonly found in the art. Each casing 18 has at one end an opening 20 to receive the light image of an object which is magnified by the optical components contained within the casing 18. The image is then presented by the monoculars 12 and 14 through eyepieces 22a and 22b. To receive a carrying strap and provide a convenient thumb rest for the user of the binoculars 10, loops 24 may be provided at each of the monoculars 12 and 14.

Each of the eyepieces 22a and 22b contains or mounts an ocular lens which is adapted to ultimately focus and magnify the image to the eyes of the user. The focusing function of the eyepieces may be so as to focus the image based upon its distance from the observer and/or, as described below, may be for the purpose of adjusting one or both of the eyepieces based upon both distance and the observer's particular diopter. For the adjustment of focus based upon distance from the observer, binoculars may be provided with a common adjustment which simultaneously moves the eyepieces. This common adjustment may be by a lever or common adjustment wheel. As illustrated in FIG. 1 the binoculars 10 include a common adjustment wheel 26 rotation of which simultaneously moves the eyepieces to focus the image based upon its distance from the observer. To accommodate such motion, each of the monoculars 12 and 14 includes at its ends opposite from the opening 20 a tube 28 which, via appropriate cams or other mechanisms, is movable to slide relative to the casing 18. The eyepieces 22a, 22b are attached to the tubes 28 so that operation of the wheel 26 moves the tubes and connected eyepieces simultaneously inwardly and outwardly from the casings 18 which naturally results in the movement of the lenses mounted therein to focus the monoculars 12 and 14 and thereby provide a common focus for the binoculars 10.

To enable the user to adjust or focus the binoculars 10 based upon his/her particular diopter, one or both of the eyepieces 22a, 22b may be adjustable relative to their mounting tube 28. For those binoculars having a common adjustment for focusing such as wheel 26, it is most often found that one of the eyepieces is adjustable for focusing the diopter of the binoculars 10 whereas the other eyepiece is substantially fixed to its mounting tube. Henceforward, for purposes of this description, the binoculars 10 will be assumed to be of the type wherein eyepiece 22a is adjustable along its tube 28 based upon the wearer's diopter whereas eyepiece 22b is substantially fixed to its mounting tube 28. Eyepiece 22a shall hereinafter be referred to as the diopter eyepiece 22a to distinguish it from the fixed eyepiece 22b.

To provide for adjustment of diopter eyepiece 22a it is threadably coupled to its mounting tube 28. Rotation of the diopter eyepiece 22a relative to the rotationally fixed tube 28 is translated by the threaded connection to axial movement of the eyepiece 22a along with tube 28. With reference to FIGS. 1 and 2, the diopter eyepiece 22a includes a housing 30 which is basically cylindrical having at one end an ocular cup 32 adapted to be nested about the eye or against the user's eyeglasses. The cup 32 is joined to a conical collar 34 which increases the outside diameter of the housing 30 from the base of the cup 32 to a rim 36 which may be grooved or otherwise provided with a gripping surface. From the rim 36, the housing 30 tapers conically inward to the tube 28 to define a conical neck 38. The neck 38 terminates at a bore (not shown) which closely receives and passes the tube 28. Within the housing 30, the diopter eyepiece 22a is threadably coupled to the tube 28. Also disposed within the diopter eyepiece 22a are the ocular lenses (also not shown) which ultimately focus and magnify the image to the observer's eye. Accordingly, rotation of the housing 30 relative to the tube 28 is translated by the threaded coupling into axial movement of the housing 30 and the lens contained therein along the tube 28 for focusing of the diopter eyepiece 22a and more particularly its lens to the user's prescription. Index means may be provided, for example, at the neck 38 to provide a visual indication of the diopter adjustment for the diopter eyepiece 22a. To cooperate with the index means, a reference indication or point 40 may be located on a boss 42 which is affixed to the casing 18 and slidably receives the tube 28.

It is of course to be understood that the present invention as hereinafter described can be used with binoculars having individual focusing eyepieces each provided with the aforesaid diopter index means.

To use the binoculars 10, the observer places the binoculars to the eyes and, by the hinge connection 16, adjust the spacing between monoculars 12, 14 so that the cups 32 of the eyepieces 22a and 22b receive the eyes. Using the common adjustment shown as wheel 26, the observer views an object and adjusts the wheel 26 until the object is clearly focused in eyepiece 22b. Thereafter, the diopter eyepiece 22a is adjusted until the image is likewise clearly focused at the other eye. Hence, by adjusting diopter eyepiece 22a, the binoculars can be focused based upon the observer's eye prescription. Thereafter, all the observer need do to view an object is to adjust the common adjustment wheel 26 which slides the tubes 28 inwardly and outwardly to focus the binoculars on the object based upon its distance from the observer.

A problem which has been encountered with binoculars of the type described above is that the diopter eyepiece 22a (or eyepieces), after it has been adjusted to the observer's eye prescription, may inadvertently rotate and thereby take the binoculars 10 out of focus. The rotation of the diopter eyepiece 22a may be caused by nervous twiddling of the observer or by other inadvertent contact with the eyepiece such as when the binoculars rub against clothing or the like. This inadvertent rotation of the diopter eyepiece to take the binoculars 10 out of focus thereby requires that the observer readjust the diopter eyepiece 22a to clearly observe a distant object. This can be frustrating when only a fleeting glimpse of an object is possible such as when viewing birds or other animals. The observer spots the object to be viewed brings binoculars to his eyes and adjusts the wheel 26 based upon the objects distance from the observer. At this point, the observer learns that the diopter eyepiece 22a has inadvertently been moved out of focus and accordingly the observer must hurriedly readjust the diopter eyepiece 22a to clearly view the object. The time necessary to adjust the diopter eyepiece 22a may be just sufficient as to loose a clear view of the object.

To prevent the inadvertent rotation of an optical instrument focusing eyepiece such as the diopter eyepiece(s) of the pair of binoculars, a friction lock ring 44 according to the present invention and as shown in FIGS. 2 and 3 is provided for such eyepiece(s). The ring 44 is disposed about the tube 28 and accordingly has an axial bore 46 with a diameter to be closely received about the tube 28. The ring 44 may be disposed about the tube 28 during assembly of the binoculars 10. Means are provided for fixing the ring 44 to the tube 28 against rotation. One and perhaps the preferable method would be to make the ring 44 out of an elastomeric materials such as neoprene rubber or the like and size the bore 46 such that the ring 44 is collapsed about and frictionally engages the tube 28, thereby fixing the ring 44 against rotation. Other suitable arrangements would be to provide a cooperating groove and tab between the tube and ring 44 or to provide a separate assembly attached to the casing 18 to support the ring 44.

To prevent the diopter eyepiece 22a from being inadvertently rotated after it has been adjusted to the observer's eye prescription, the ring 44 includes an inwardly tapering, annular face 48 which is adapted to engage and mate with the neck 38 for the diopter eyepiece 22a. As shown, the face 48 may be fashioned to be smooth and tapered to be mate with the neck 38 to provide a frictional coupling between the diopter eyepiece 22a and the ring 44 which is fixed against rotation about the tube 28. Alternatively, the neck 38 and face 48 may be provided with coupling surfaces such as slots and grooves or the like.

The ring 44 is movable from a retracted position where it is moved down the tube 28 from the position in FIG. 2 to a position where the face 48 is remote from the neck 38. With the ring 44 in a retracted position, the diopter eyepiece 22a is freely adjustable in the manner described above to adjust the binoculars 10 to the observer's eye prescription. To prevent inadvertent rotation of the diopter eyepiece 22a, the ring 44 is movable to a locked position (raised position as shown in FIG. 2) where the face 48 contacts the neck 38 to fix the diopter eyepiece 22a to the ring 44 which is, in turn, fixed to the non-rotatable tube 28. Hence, inadvertent rotation of the diopter eyepiece 22a is prevented. Where the ring 44 is fashioned from an elastomeric material such as neoprene, the frictional contact between the face 48 and neck 38 is believed to be sufficient to prevent inadvertent rotation of the diopter eyepiece 22a. Of course, the face 48 may be provided with some material having a high coefficient of friction if desired. To still provide for a reading of the index means for the diopter eyepiece 22a, a slot 50 may be provided at a location on the ring 44.

With reference to FIGS. 4 and 5, yet another embodiment of the present invention is shown. The same components will carry the same reference numerals.

As shown in FIGS. 4 and 5, a ring 44' is provided which has an annular base 52 defined by an axial bore 46. The ring 44' is adapted to be fixed to the tube 28 against rotation and, if desired, against axial movement along the tube 28. Accordingly, the bore 46 may be made somewhat smaller than the bore of the ring 44 described above with reference to FIGS. 2 and 3. From the base 52, the ring 44' includes a circumferential, pliable lip 54 which may define a somewhat inwardly tapering face 48' for the ring 44'. The face 48' terminates at an annular stop surface 56.

In use, the ring 44' is disposed about the tube 28, for example, during assembly of the binoculars 10. The ring 44' is coupled to the tube 28 against rotation and may even be fixed against axial movement along the tube 28. For example, by fashioning the ring 44' out of an elastomeric material, such as neoprene rubber, and properly sizing the bore 46, the ring 44' may be constricted about and frictionally coupled to the tube 28. The ring 44' is positioned such that the neck 38 terminates at or adjacent the stop surface 56. The lip 54 is adapted to be folded back upon itself such that the face 48' is displaced from the neck 38 as is shown in FIG. 4. With the ring 44' in the folded back position, the diopter eyepiece 22a is freely rotatable to adjust the focus of the binoculars 10 to the observer's eye prescription. Once focused, the lip 54 is returned to its upright position as shown in FIG. 5 resulting in the face 48' contacting the neck 38. Means are provided between the face 48' and neck 38 for fixing the diopter eyepiece 22a to the ring 44'. These coupling means may be the frictional engagement caused by the friction between the face 48' and neck 38. Neoprene has a sufficiently high coefficient of friction and is believed to be suitable for this application. Of course, the surface 48' may be provided with a coating or a configuration to enhance the coupling between the ring 44' and the diopter eyepiece 22a. When the lip 54 is returned to the upright position, the diopter eyepiece 22a is prevented from inadvertent rotation from its adjusted position. Like the embodiment described above, the ring 44' may include a slot 50 by which the index means for the diopter eyepiece 22a can be observed.

While I have shown and described certain embodiments of the present invention, it is to be understood that it subject to many modifications without departing from the spirit and scope of the claims set forth herein. For example, the ring may be sufficiently elastic to be expanded to pass over the eyepiece and, when released, constrict about the tube.

What is claimed is:

1. In a viewing device having a fixed tube, an eyepiece rotatably disposed on the tube, and means between the tube and eyepiece for translating rotation of the eyepiece into axial movement of the eyepiece along the tube for focusing the device, the improvement comprising:
    a lock ring fixed about said tube against rotation and having an annular face, the face being movable from a retracted position where the face is displaced from the eyepiece to a lock position where the face frictionally engages the eyepiece to prevent inadvertent rotation of said eyepiece.

2. The device of claim 1 wherein the lock ring is rigid and is movable along the tube to position its face in the retracted or lock position.

3. The device of claim 2 wherein the lock ring frictionally engages the tube at the lock position to maintain the frictional engagement between said face and eyepiece.

4. The device of claim 1 wherein the eyepiece includes an annular, beveled surface and the ring face is cooperatively contoured to mate with and frictionally engage said surface.

5. The device of claim 1 wherein the ring is fixed to said tube against rotation and said face is disposed on a pliable lip deformable between a retracted position where the face is disengaged from the eyepiece to a lock position where the face contacts said eyepiece.

6. The device of claim 5 wherein the lip is adapted to be folded over upon itself to disengage the face from the eyepiece.

7. The device of claim 5 wherein the ring and its lip are fashioned from a resilient, pliable material.

8. The device of claim 1 wherein the lock ring is disposed about the tube and frictionally engages an adjustable diopter eyepiece carried on the tube.

9. The device of claim 1 wherein the viewing device comprises binoculars, and the lock ring prevents a diopter eyepiece thereof from inadvertant rotation.

10. A lock ring for viewing device having a focus adjustable eyepiece rotatably disposed on a tube, rotation of the eyepiece for focusing the device, comprising:
   said lock ring adapted to be disposed about said tube and includes an annular face adapted to engage and couple said ring to the eyepiece;
   means for fixing said lock ring against rotation; and
   means for displacing said annular face from a retracted position disengaged from said eyepiece to permit rotation for focusing the device to a lock position where said annular face engages the eyepiece to prevent inadventent rotation thereof.

11. The ring of claim 10 wherein said ring is fashioned to include a bore to pass said tube, said fixing means including means for providing said bore with a dimension to frictionally fix said ring on the tube.

12. The ring of claim 11 wherein the lock ring at said bore presents a material having a high coefficient of friction.

13. The ring of claim 11 wherein the lock ring is fashioned from a resilient material adapted to be contracted about the tube.

14. The ring of claim 10 wherein the displacing means includes means for providing the lock ring with a resilient deformable lip defining said face, said lip adapted to be folded upon itself to disengage the face from the eyepiece.

15. The device of claim 8 wherein the lock ring is disposed about the tube and frictionally engages an adjustable diopter eyepiece carried on the tube.

16. The device of claim 8 wherein the viewing device comprises binoculars, and the lock ring prevents a diopter eyepiece thereof from inadvertent rotation.

17. Apparatus for preventing inadvertent rotation of a diopter eyepiece contained in binoculars having a fixed tube, an eyepiece having a focusing ocular lens, the eyepiece being disposed on the tube for use in viewing an image formed by the optical system of the binoculars, means for translating the eyepiece along the tube for moving the ocular lens along an optical axis for focusing on an object depending upon the distance of the object from the user, the eyepiece being rotatably disposed on the tube for translating rotation of the eyepiece into axial movement of the ocular lens along the tube to provide a diopter adjustment for the user, the improvement comprising a lock ring fixed about said tube against rotation and having an annular face movable from a retracted position where the face is displaced from the eyepiece to a lock position where the face frictionally engages the eyepiece to prevent inadvertent rotation of the eyepiece.

18. The device of claim 17 wherein the lock ring is rigid and is movable along the tube to position its face in the retracted or lock position.

19. The device of claim 18 wherein the lock ring frictionally engages the tube in the lock position to maintain the frictional engagement between said face and eyepiece.

20. The device of claim 17 in which the lock ring is made from a resilient material adapted to be contracted about the tube and is deformable so as to be folded upon itself to disengage the face from the eyepiece, the lock ring being made from a material having a high coefficient of friction so as to prevent inadvertent rotation in the lock position.

* * * * *